United States Patent [19]
Rozman

[11] Patent Number: 6,104,623
[45] Date of Patent: Aug. 15, 2000

[54] MULTIPLE OUTPUT CONVERTER HAVING SECONDARY REGULATOR USING SELF-DRIVEN SYNCHRONOUS RECTIFIERS

[75] Inventor: Allen F. Rozman, Richardson, Tex.

[73] Assignee: Lucent Technologies, Inc., Holmdel, N.J.

[21] Appl. No.: 09/425,140

[22] Filed: Oct. 21, 1999

[51] Int. Cl.[7] .......................... H02M 3/335; H02M 7/155
[52] U.S. Cl. .................. 363/21; 363/89; 363/97; 363/127
[58] Field of Search .................. 363/15, 16, 20, 363/21, 45, 52, 53, 89, 97, 125, 127, 131

[56] References Cited

U.S. PATENT DOCUMENTS

| | | | |
|---|---|---|---|
| 4,870,555 | 9/1989 | White | 363/21 |
| 5,038,264 | 8/1991 | Steigerwald | 363/21 |
| 5,274,543 | 12/1993 | Loftus, Jr. | 363/127 |
| 5,282,123 | 1/1994 | Boylan et al. | 363/21 |
| 5,291,382 | 3/1994 | Cohen | 363/16 |
| 5,303,138 | 4/1994 | Rozman | 363/21 |
| 5,327,333 | 7/1994 | Boylan et al. | 363/21 |
| 5,400,239 | 3/1995 | Caine | 363/67 |
| 5,453,921 | 9/1995 | Shutts | 363/21 |
| 5,490,055 | 2/1996 | Boylan et al. | 363/41 |
| 5,528,482 | 6/1996 | Rozman | 363/21 |
| 5,541,828 | 7/1996 | Rozman | 363/21 |
| 5,590,032 | 12/1996 | Bowman et al. | 363/15 |
| 5,625,541 | 4/1997 | Rozman | 363/21 |
| 5,663,876 | 9/1997 | Newton et al. | 363/126 |
| 5,726,869 | 3/1998 | Yamashita et al. | 363/21 |
| 5,734,563 | 3/1998 | Shinada | 363/21 |
| 5,870,299 | 2/1999 | Rozman | 363/127 |
| 5,872,705 | 2/1999 | Loftus, Jr. et al. | 363/21 |
| 5,909,360 | 6/1999 | Lavin et al. | 363/21 |
| 5,986,911 | 11/1999 | Tang | 363/89 |
| 6,008,998 | 12/1999 | Han | 363/16 |
| 6,011,703 | 1/2000 | Boylan et al. | 363/21 |
| 6,028,373 | 2/2000 | Kim et al. | 307/31 |
| 6,038,147 | 3/2000 | Jacobs et al. | 363/21 |

OTHER PUBLICATIONS

Cherry Semiconductor Corporation "Secondary Side Post Regulator of AC/DC and DC/DC Multiple Output Converters CS–5101" Mar., 1997, pp. 1–7.

Cherry Semiconductor Corporation "Secondary Side Post Regulator (SSPR) for Switching Power Supplies with Multiple Outputs CS 5101 Application Note", Apr. 1997, pp. 1–13.

Levin, G. "A New Secondary Side Post Regulator (SSPR) PWM Controller for Multiple Output Power Supplies" Proceeding APEC, 1995, pp. 736–742, (No month).

*Primary Examiner*—Adolf Deneke Berhane
*Attorney, Agent, or Firm*—Locke Liddell & Sapp LLP

[57] ABSTRACT

A DC—DC converter includes a transformer having at least a primary winding, a secondary winding and a drive winding. An input circuit is coupled to the transformer primary winding for coupling an input DC voltage to the transformer primary winding. A first output channel couples the transformer secondary winding to a first output. The first output channel includes a self-driven synchronous rectifier circuit, a first inductor, and a first capacitor. A first pulse width modulator is coupled between the first output channel and the input circuit to drive the input circuit, thereby regulating the first output channel. A second output channel couples the transformer secondary winding to a second output. The second output channel includes a control switch, a freewheeling rectifier, a second inductor, and a second capacitor. A second pulse width modulator is coupled between the second output channel and the control switch for controlling a conduction interval of the control switch, to thereby regulate the second output channel independent of the first output channel. An enabling switch, controlled by the second pulse width modulator, is coupled between the transformer drive winding and a control terminal of the control switch, such that the enabling switch modifies a voltage of the transformer drive winding to control the conductivity state of the control switch. A drive rectifier is coupled between the transformer drive winding and a control terminal of the freewheeling rectifier. A discharge switch is coupled to the control terminal of the freewheeling rectifier, wherein the discharge switch is controlled by the second pulse width modulator to control the conductivity state of the freewheeling rectifier.

4 Claims, 2 Drawing Sheets

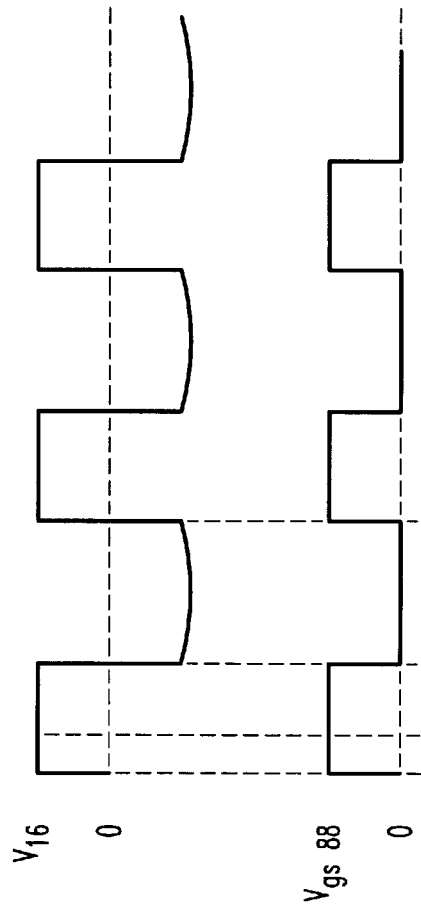
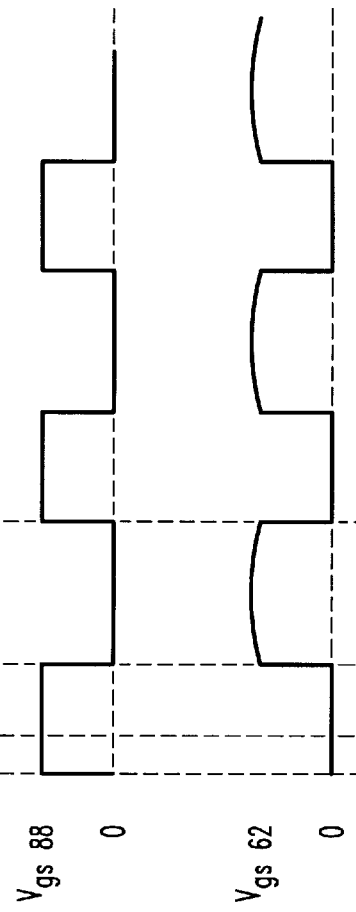
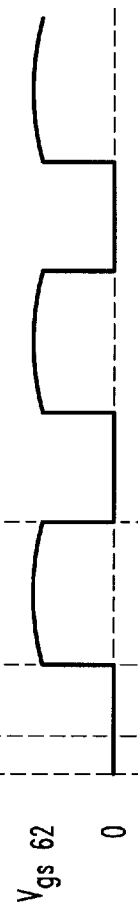
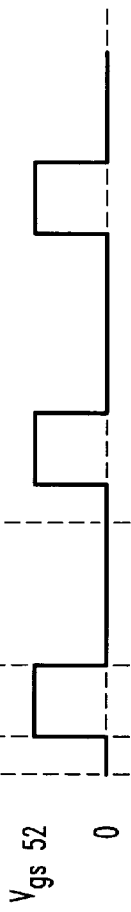
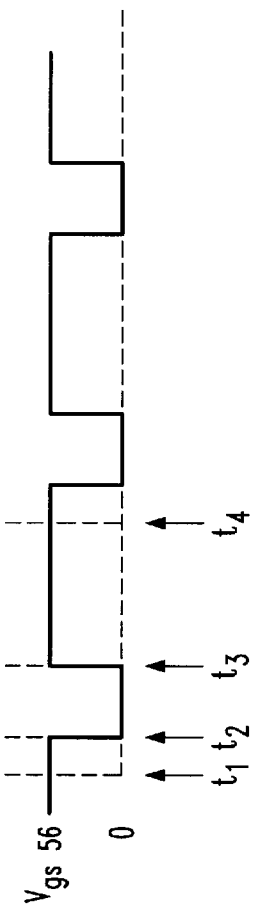
FIG. 2A
FIG. 2B
FIG. 2C
FIG. 2D
FIG. 2E

MULTIPLE OUTPUT CONVERTER HAVING SECONDARY REGULATOR USING SELF-DRIVEN SYNCHRONOUS RECTIFIERS

BACKGROUND OF THE INVENTION

DC—DC converters are normally used as constant DC voltage power supplies. The desirability of having a DC—DC converter that provides a number of different voltage outputs to a number of different independent loads has been recognized. There is a continuing need for such a circuit which has the advantages of clamped mode circuits, is of relatively simple construction and relatively inexpensive, and which provide stable voltage levels to a number of independent loads that, if desired, can be electrically isolated. With electrical isolation, noise, impedance changes, and the like from one load would not affect the power transmitted to another load.

Multiple output DC—DC converters providing a regulated voltage have typically required separate outputs provided by separate transformer windings as well as independent direct voltage regulating controls for each output where precise regulation is required. In a typical forward or flyback converter with multiple outputs, the non-conduction intervals of the power switch may result in a non-continuous transfer of energy to the output which results in an inefficient transfer of energy to the output.

Power converters have utilized synchronized rectifiers because of their compact size and high efficiency. Self synchronized rectifiers refer to rectifies using MOSFET rectifying devices having control terminals which are driven by voltages of the windings of the power transformer in order to provide the rectification of the output of the transformer. However, post regulated multiple output topologies suffer in efficiency, particularly when synchronous rectifiers are self-driven.

A need has thus arisen for an improved converter utilizing self-driven synchronous rectifiers.

SUMMARY OF THE INVENTION

In accordance with the present invention, a DC—DC converter is provided. The converter includes a transformer having at least a primary winding, a secondary winding and a drive winding. An input circuit is coupled to the transformer primary winding for coupling an input DC voltage to the transformer primary winding. A first output channel couples the transformer secondary winding to a first output. The first output channel includes a self-driven synchronous rectifier circuit, a first inductor, and a first capacitor. A first pulse width modulator is coupled between the first output channel and the input circuit to drive the input circuit, thereby regulating the first output channel. A second output channel couples the transformer secondary winding to a second output. The second output channel includes a control switch, a freewheeling rectifier, a second inductor, and a second capacitor. A second pulse width modulator is coupled between the second output channel and the control switch for controlling a conduction interval of the control switch, to thereby regulate the second output channel independent of the first output channel. An enabling switch, controlled by the second pulse width modulator, is coupled between the transformer drive winding and a control terminal of the control switch, such that the enabling switch modifies a voltage of the transformer drive winding to control the conductivity state of the control switch. A drive rectifier is coupled between the transformer drive winding and a control terminal of the freewheeling rectifier. A discharge switch is coupled to the control terminal of the freewheeling rectifier, wherein the discharge switch is controlled by the second pulse width modulator to control the conductivity state of the freewheeling rectifier.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which:

FIGS. 2a–2e are circuit waveforms of the present converter.

DESCRIPTION OF THE PREFERRED EMBODIMENTS

Figure 1:
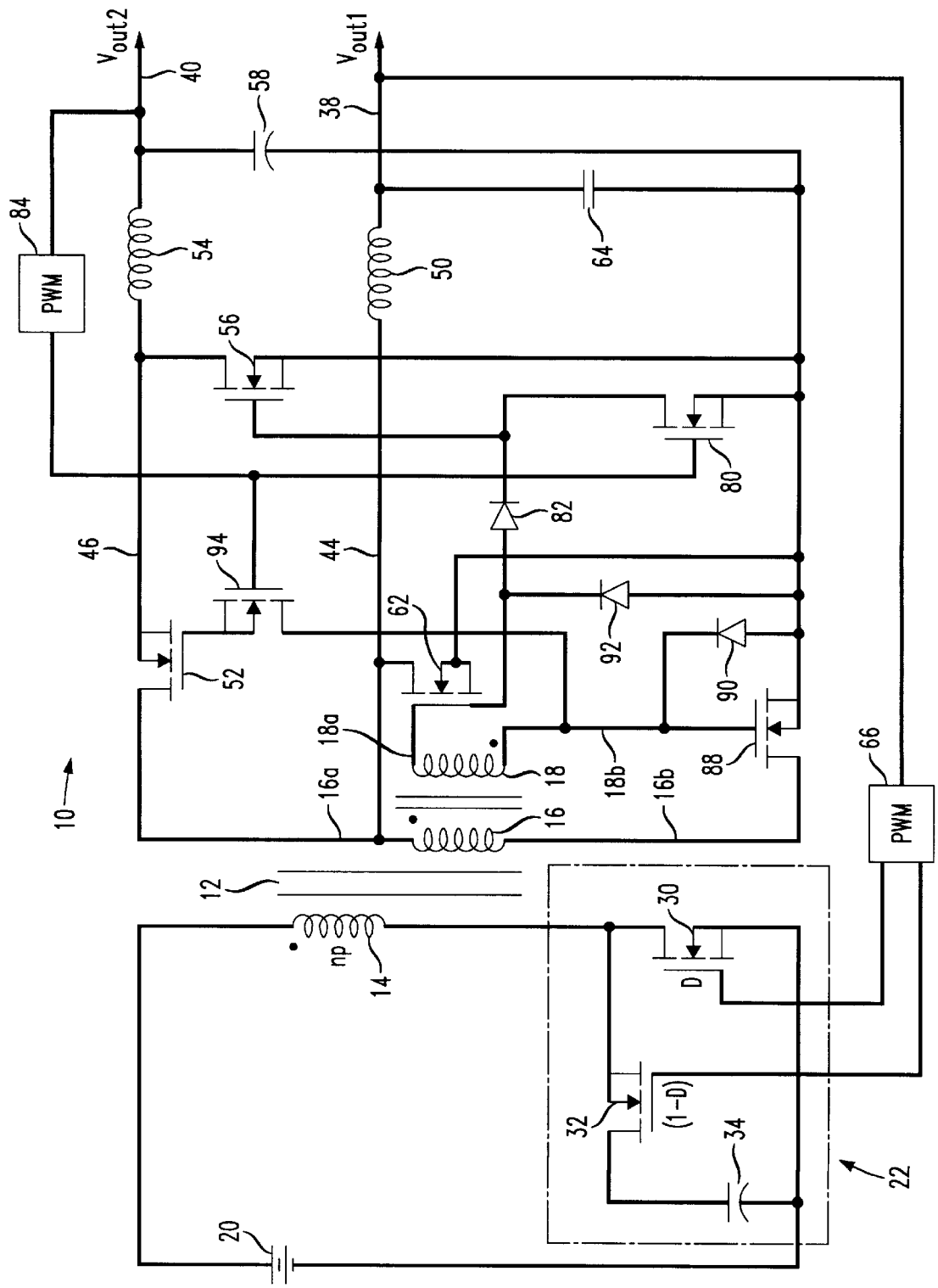
FIG. 1 is a schematic diagram of an exemplary embodiment of the present DC—DC converter.

Referring to FIG. 1, a schematic diagram of an exemplary embodiment of the present DC—DC converter circuit is illustrated, and is generally identified by the numeral 10. Converter 10 includes a transformer 12 having a primary winding 14, a secondary winding 16, and a secondary drive winding 18. Secondary winding 16 includes terminals 16a and 16b. Secondary drive winding 18 includes terminals 18a and 18b. Windings 14, 16, and 18 comprise transformer 12. A DC input voltage 20 is applied to primary winding 14 of transformer 12 under the control of an input circuit, generally identified by the numeral 22. Any input circuit capable of driving the primary winding of the transformer 12 with a bi-polar excitation, either with or without dead time, is suitable for use with the present invention. Input circuits that generally do not exhibit dead time may comprise, for example, a zero voltage switching half bridge circuit, an active clamp circuit as illustrated in FIG. 1, or a two transformer active clamp circuit. Input circuits that generally exhibit dead time may comprise, for example, a push-pull circuit, a hard switching half-bridge, or a full-bridge. For a more complete discussion of alternative input circuits, see the following reference, incorporated herein be reference in its entirety: *Principles of Power Electronics*, by J. Kassakian, M. Schlecht, and G. Verghese, Addison-Wesley Publishing Company, 1991.

For a more detailed example of alternative input circuits and synchronous rectifier topologies, see the following patents, all incorporated herein by reference in their entirety: (1) U.S. Pat. No. 5,528,482 to Rozman, entitled Low Loss Synchronous Rectifier for Application to Clamped-Mode Power Converters, issued Jun. 18, 1996; (2) U.S. Pat. No. 5,274,543 to Loftus, entitled Zero Voltage Switching Power Converter Circuit with Loss-less Synchronous Rectifier Gate Drive, issued Dec. 28, 1993; and (3) U.S. Pat. No. 5,291,382 to Cohen entitled Pulse Width Modulated DC/DC Converter with Reduced Ripple Current Component Stress and Zero Voltage Switching Capability issued Mar. 1, 1994; and (4) U.S. Pat. No. 5,590,032 to Bowman et al., entitled Self Synchronized Drive Circuit for a Synchronous Rectifier in a clamped-mode Power Converter, issued Dec. 31, 1996.

Input circuit 22 in the form of a clamping circuit includes a FET power switch 30 which is periodically biased conducting to enable current flow, in response to input voltage 20 through primary winding 14 of transformer 12 for the duration D as a part of the periodic cycle. A clamping circuit including a series connected FET switch 32 and a capacitor 34 is connected in parallel with switch 30. Switch 32 is enabled conducting during the (I-D) portion of the periodic cycle. The voltage stored on capacitor 34 is charged to a level VC1 and clamps the voltage of transformer 12 primary winding 14 to a substantially constant average level $V_{in}/(1-D)$ during the non-conduction of switch 30.

Power output from secondary winding 16 of transformer 12 is connected to first and second outputs 38 and 40 via first and second output channels 44 and 46, respectively. First output channel 44 is connected to terminal 16a of secondary winding 16 and includes an inductor 50, MOSFET synchronous rectifiers 62 and 88, a capacitor 64, and diodes 90 and 92. Second output channel 46 is connected to terminal 16a of secondary winding 16 and includes a MOSFET synchronous freewheeling rectifier 56, a control switch 52, an inductor 54, and a capacitor 58.

Detailed operation of a Pulse Width Modulated (PWM) power converter, including those with an active clamp or other suitable input circuits, is well known in the art and will not be discussed in detail here.

The exemplary embodiment shown in FIG. 1 provides two independently regulated outputs having the same polarity (either positive or negative), and sharing a common circuit return, or ground. Output 38 is regulated via a PWM circuit 66 and the input circuit 22, which varies the operating duty ratio to regulate out variations in input voltage or load current, for example. Output 40 is regulated via a PWM circuit 84, which further modifies the voltage waveform applied by winding 16 using control switch 52. In this manner, output 40 can be regulated independently of output 38, even though both outputs are connected to secondary winding 16. Output 40, in the illustrated embodiment, will necessarily be regulated to a lower voltage than output 38 due to th step down nature of output channel 46. For a more detailed example of alternative multiple output rectifier topologies, see the following patent, incorporated herein by reference in its entirety: U.S. Pat. No. 5,541,828 to Rozman, entitled Multiple Output Converter with Continuous Power Transfer to an Output and With Multiple Output Regulation, issued Jun. 30, 1996.

It is often advantageous to drive the synchronous rectifiers using a winding driven, or self driven technique, as illustrated in FIG. 1. The self driven technique allows the gates of the synchronous MOSFETs (62 and 88, for example) to be driven directly from the transformer winding voltages, which are naturally synchronized to the input circuit and which derive drive energy directly from the power transformer. In the exemplary embodiment of FIG. 1, the drive winding 18 is similar to a circuit described by Bowman et al, in U.S. Pat. No. 5,590,032. With this technique, the conduction intervals of the synchronous rectifiers are substantially determined by the voltage levels present on winding 18. The same drive technique, however, is not directly applicable to the synchronous FET 56 and the control switch 52 of output 40. This is because the conduction intervals for switches 56 and 52 must be different than the conduction intervals of switches 62 and 88, respectively, in order to perform the independent regulation of output 40. Therefore, a circuit capable of realizing the efficiency advantages of the self driven technique for MOSFETs 52 and 56, and also capable of driving the FETs to perform regulation, would be advantageous.

Operation of the exemplary embodiment shown in FIG. 1 may be more readily understood with reference to the idealized circuit waveforms of FIGS. 2a–2e. FIG. 2a shows the voltage across the winding 16, and is typical of a bipolar excitation exhibiting substantially no dead time. The voltage waveform across winding 18 will be similar to FIG. 2a, scaled by the winding turns ratio. FIG. 2b and 2c show idealized gate to source waveforms (Vgs) for FETs 88 and 62, respectively. In order to perform the regulation function for output 40, the drive for switch 56 must differ from the drive for switch 62, as shown in FIG. 2e. Specifically, the drive for switch 56 must be held up during the t1 to t2 time interval, wherein the drive for switch 62 is substantially zero during this time. In operation, the gate of switch 56 is charged by the winding 18 through a diode 82. Diode 82 then acts to hold the voltage on the gate of switch 56 high after the winding voltage reverses. PWM circuit 84 then discharges the gate of 56 through transistor 80.

Drive to control switch 52 must differ from the drive to switch 88, in order to perform the regulation function, as shown in the time interval t1–t2 of FIG. 2d. As the gate of switch 88 goes high at t1, drive to the gate of control switch 52 is blocked by a switch 94. Switch 94 is enabled by the PWM circuit 84 at time t2, thus allowing the gate of 52 to charge from the winding 18 through switch 94. Control switch 52 then remains on, transfering energy from winding 16 to output 40, until time t3. At time t3, the voltage at winding 18 reverses, discharging the gate of 52 through the channel and/or body diode of switch 94. Regulation of output 40 is achieved via PWM circuit 84, which controls the conductivity interval of control switch 52 using switch 94. Synchronous rectifier FET 56 is driven to maintain conductivity during the time that control switch 52 is nonconductive, thus enhancing the overall efficiency of the converter.

Thus, a multiple output synchronous rectifier circuit is provided which allows a control switch and a synchronous rectifier to be transformer winding driven, thus deriving the benefits of the self driven technique, while also allowing a PWM circuit to independently modulate the duty ratio of the control switch and synchronous rectifier to perform a regulation function.

Whereas the present invention has been described with respect to specific embodiments thereof, it will be understood that various changes and modifications will be suggested to one skilled in the art and it is intended to encompass such changes and modifications as fall within the scope of the appended claims.

What is claimed is:

1. A DC—DC converter, comprising:

a transformer having at least a primary winding, a secondary winding and a drive winding;

an input circuit coupled to said primary winding of for coupling an input DC voltage to said transformer primary winding;

a first output channel coupling said transformer secondary winding to a first output, said first output channel including a self driven synchronous rectifier circuit, a first inductor, and a first capacitor;

a first pulse width modulator coupled between said first output channel and said input circuit to drive said input circuit, thereby regulating said first output channel;

a second output channel coupling said transformer secondary winding to a second output, said second output channel including a control switch, a freewheeling rectifier, a second inductor, and a second capacitor;

a second pulse width modulator coupled between said second output channel and said control switch for controlling a conduction interval of said control switch to thereby regulate said second output channel independent of said first output channel;

an enabling switch, controlled by said second pulse width modulator and coupled between said transformer drive winding and a control terminal of said control switch, wherein said enabling switch modifies a voltage of said transformer drive winding to control the conductivity state of said control switch; and a drive rectifier, coupled between said transformer drive winding and a control terminal of said freewheeling rectifier, and a discharge switch coupled to said control terminal of said freewheeling rectifier, wherein said discharge switch is controlled by said second pulse width modulator to control the conductivity state of said freewheeling rectifier.

2. The converter of claim 1 wherein said input circuit includes:

a first switch connected in series with said primary winding and said input DC voltage;

a clamping circuit including a storage capacitor; and a second switch enabled to couple said storage capacitor to said primary winding when said first switch is non-conducting.

3. The converter of claim 1 wherein said input circuit is selected from the group consisting of:

a zero voltage switching half bridge; and a hard switching half bridge; and a push pull circuit; and a full bridge.

4. The converter of claim 1 wherein said control switch, enabling switch, freewheeling rectifier, and discharge switch comprise MOSFETS.

* * * * *